United States Patent
Korst

(10) Patent No.: US 7,530,090 B2
(45) Date of Patent: May 5, 2009

(54) SYSTEM FOR TRANSMITTING PROGRAMS TO CLIENT TERMINALS

(75) Inventor: Johannes Henricus Maria Korst, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 1121 days.

(21) Appl. No.: 10/480,127

(22) PCT Filed: Jun. 13, 2002

(86) PCT No.: PCT/IB02/02268

§ 371 (c)(1),
(2), (4) Date: Dec. 9, 2003

(87) PCT Pub. No.: WO02/104028

PCT Pub. Date: Dec. 27, 2002

(65) Prior Publication Data

US 2004/0158868 A1   Aug. 12, 2004

(30) Foreign Application Priority Data

Jun. 15, 2001   (EP) .................................. 01202303

(51) Int. Cl.
*H04N 7/173*   (2006.01)
(52) U.S. Cl. ............................. 725/101; 725/87; 725/94; 725/95; 725/96; 725/97; 725/100; 725/102; 725/103

(58) Field of Classification Search ............. 725/94–97, 725/100–103, 87
See application file for complete search history.

(56) References Cited

U.S. PATENT DOCUMENTS

| | | | |
|---|---|---|---|
| 5,421,031 A | 5/1995 | De Bey | 455/5.1 |
| 5,446,490 A * | 8/1995 | Blahut et al. | 725/97 |
| 5,524,271 A | 6/1996 | Hollmann et al. | 455/3.1 |
| 5,721,823 A * | 2/1998 | Chen et al. | 709/203 |
| 5,835,843 A * | 11/1998 | Haddad | 725/115 |
| 5,884,141 A * | 3/1999 | Inoue et al. | 725/101 |
| 5,936,659 A * | 8/1999 | Viswanathan et al. | 725/103 |
| 5,977,964 A * | 11/1999 | Williams et al. | 715/721 |
| 7,143,431 B1 * | 11/2006 | Eager et al. | 725/101 |

* cited by examiner

*Primary Examiner*—Jason P Salce
*Assistant Examiner*—Alexander Q Huerta

(57) ABSTRACT

A system (100) has a collection of programs on a central storage device (112). The system (100) supplies a particular program to a plurality of client terminals (104, 106) in a near-video-on-demand fashion using a redundant broadcast schedule. The users of the client terminals have a maximum waiting time until the client terminal can present the start of the program. An individual client terminal (104) may offer a shorter maximum waiting time to its user by prerecording a fraction of the program that is broadcast as part of the broadcast schedule.

10 Claims, 2 Drawing Sheets

SYSTEM FOR TRANSMITTING PROGRAMS TO CLIENT TERMINALS

The invention relates to a method of supplying a program to a plurality of client terminals in a near-video-on-demand fashion using a redundant broadcast schedule in which users of the client terminals requesting a program have a maximum waiting time $w_{max}$ until the respective client terminals are able to present the start of the program, the method comprising: determining a broadcast schedule for the program, and broadcasting the program according to this broadcast schedule.

The invention also relates to a system for supplying a program to a plurality of client terminals in a near-video-on-demand fashion using a redundant broadcast schedule in which users of the client terminals requesting a program have a maximum waiting time $w_{max}$ prior to the respective client terminals being able to present the start of the program, the system comprising: schedule determining means for determining a broadcast schedule for the program, and broadcast means for broadcasting the program according to this broadcast schedule.

The invention also relates to an apparatus for use as a client terminal in such a system.

As opposed to video-on-demand systems, near-video-on-demand systems offer users a choice from a relatively small number of different video programs. The video programs in a near-video-on-demand system are periodically broadcast and the same program is started relatively often, thus offering the user the program with only a short waiting time until the next start. A near-video-on-demand system tries to offer the user a service similar to a true video-on-demand system, where a user request for a certain program is immediately honored whenever a channel is available. A video-on-demand system provides the program via a dedicated channel for each user, while a near-video-on-demand system broadcasts the program via a plurality of channels to all users simultaneously, thus reducing the potentially large number of channels required in video-on-demand. An important Quality-of-Service indicator of a near-video-on-demand system is the maximum time that a user requesting a certain program has to wait until that user can start watching the program. This maximum time is also called maximum waiting time and is, unless indicated otherwise, expressed as a fraction of the duration of the program. U.S. Pat. No. 5,421,031 describes a near-video-on-demand system that optimizes the transmission of the programs to client terminals in order to improve this maximum waiting time. In this system, a video program is not broadcast sequentially but split up into multiple blocks, the blocks at the start of the program being broadcast more frequently than blocks at the end of the program. The broadcast channels are divided into slots such that each slot corresponds to the time required for broadcasting a block through that channel. In the schedule used in this known system, block i is broadcast in slot s if and only if s mod i =0. The resultant broadcast schedule of the blocks is periodic with a period that is equal to the least common multiple of 1, 2, 3, . . . , n. An important property of this schedule is that in each window of i successive slots, i =1, . . . , n, there is exactly one broadcast of block i. This ensures that a user of a client terminal has to wait at most one slot to be able to start watching a program or, more precisely, the user has to wait till the start of the next slot. Thus, the known system has a maximum waiting time, here expressed in absolute time, that equals the duration of a slot which equals the duration of one block of the program. Upon receiving a request from the user, the client terminal starts receiving blocks for the corresponding video program via channels that have been assigned to that schedule. In a single slot, usually a plurality of blocks are received via respective channels. The blocks are provided with an identifier and the client terminal analyzes each received block. A received block may need to be presented by the client terminal instantaneously. Furthermore, a received block may be from a later section of the program and, therefore, needs to be presented later. In that case the client terminal temporarily stores the block in a buffer for later presentation. Finally, the received block may be from an earlier section of the program and therefore may already have been presented. In that case the client terminal discards the received block. An example of a schedule in this known system is for a video program of 60 minutes that is partitioned into 12 blocks. This results in a schedule with a maximum waiting time of 5 minutes. If a shorter maximum waiting time is necessary, the system may be set up in such a way that the program is divided into a larger number of blocks. However this will lead to a schedule where a larger number of blocks may be broadcast in a single slot. This means that in this system setup, a larger number of channels must be assigned to this schedule and that the client terminal must be able to buffer a larger number of blocks.

U.S. Pat. No. 5,524,271 describes an alternative fragmented broadcast schedule. According to this schedule, block i is not broadcast exactly once every i slots, but block i is broadcast at least once every i slots. In this way, one can avoid that many blocks have to be broadcast in the same slot, that is, at the expense of broadcasting some blocks more frequently than strictly necessary. This makes that fewer channels are necessary for this broadcast schedule. Note that if each block i is broadcast at least once every i slots, a user of a client terminal still has to wait until the start of the next slot to start watching the movie.

It is an object of the invention to provide a method according to the preamble with an improved determination of the maximum waiting time. This object is achieved according to the invention in a method that also comprises for a particular client terminal i the step of determining the size of a client fraction of the program to be prerecorded by the particular client terminal i in order to achieve a maximum waiting time of $w_i$, $w_i<w_{max}$, and in the particular client terminal i the step of prerecording the client fraction of the program. This method provides a flexible determination of the maximum waiting time for a particular client terminal. The client terminals in general can offer their users the maximum waiting time $w_{max}$ according to the broadcast schedule and an individual client terminal can provide its user with a shorter maximum waiting time while using the same broadcast schedule as the other client terminals. Thus, the individual shorter maximum waiting time is realized without affecting the overall setup and hence without affecting the other client terminals. The shorter maximum waiting time for the particular client terminal is achieved by prerecording a first fraction, called the client fraction, of the broadcast program on a local storage device of the client terminal. This prerecording is done in advance, i.e. without the user actually requesting this particular program, and when the user requests this program the prerecorded fraction is available for presentation so as to shorten the delay required to align with the broadcast schedule. This first fraction is part of the broadcast schedule of this program and as such is regularly broadcast. The first fraction may, therefore, be received in the client terminal by scanning the appropriate channels allocated to the broadcast schedule of this program. A major advantage of the method of the invention is that a particular client terminal and its available resources can be tuned to the individual needs of the user of that client terminal without having to take into account the resources of the other client terminals. Users that have a client terminal that is equipped with a larger storage device can thus realize smaller maximum waiting times.

In the system that is known from U.S. Pat. No. 5,421,031, a form of prerecording is described in col. 11, lines 5 to 28. However, this prerecording is different than the one proposed in the present invention. In the prerecording of the known system, all client terminals must prerecord a part of the program and the broadcast schedule is modified to take into account the prerecording. This leads to a different system setup where all client terminals have the same shorter maximum waiting time, which may be zero, at the expense of prerecording by all client terminals. The known system does not offer the flexibility of the present invention where a general, basic maximum waiting time is realized for all client terminals and where an individual client terminal may offer its user a shorter maximum waiting time.

A version of the method according to the invention is described in claim 2. This version allows for a shorter maximum waiting time for all client terminals. It is checked whether the desired general maximum waiting time requires prerecording of an initial fraction of the program by all client terminals. To this end, the size of the initial fraction is calculated and, if any, this initial fraction is applied to all client terminals. This supply can, for example, be done overnight or via a separate channel dedicated to supply this fraction, and optionally initial fractions of other programs, to the client terminals. Furthermore, a broadcast schedule is then determined for the remainder of the program, i.e. for the program minus the initial fraction, having the shorter maximum waiting time for all client terminals. Thus in this embodiment all client terminals prerecord a fraction of the program in order to be able to offer a certain maximum waiting time and a particular individual client terminal may decide to prerecord a larger fraction in order to be able to offer a shorter maximum waiting time. Moreover, in this embodiment the shorter maximum waiting time for the particular client terminal is realized without affecting the overall setup and the other client terminals.

A version of the method according to the invention is described in claim 3. Staggered broadcasting is a relatively simple way to realize the near-video-on-demand supply of programs to client terminals. The program or, if prerecording in all client terminals is done, the remainder of the program, is repeatedly broadcast in the normal sequential order in a number of channels, the start of the programs in the different channels being staggered in time. According to this version, use is made of the smallest size of the initial fraction to be prerecorded by all client terminals that allows a broadcast schedule with the desired maximum waiting time of $w_{max}$.

A version of the method according to the invention is described in claim 4. This version utilizes the smallest size of the fraction to be prerecorded that allows a broadcast schedule with the desired maximum waiting time for the particular client terminal.

A version of the method according to the invention is described in claim 5. Fragmented broadcasting is a way to realize the near-video-on-demand supply of programs to client terminals in a small number of channels per program. According to this version, use is made of the smallest size of the initial fraction to be prerecorded by all client terminals that allows a broadcast schedule with the desired maximum waiting time of $w_{max}$.

A version of the method according to the invention is described in claim 6. This version utilizes the smallest size of the fraction to be prerecorded that allows a broadcast schedule with the desired maximum waiting time for the particular client terminal.

A version of the method according to the invention is described in claim 7. It is advantageous to allow the user to determine the maximum waiting time. In particular when a plurality of programs are supplied, the user can easily indicate the ones that are of interest and that may be selected for viewing in the near future. In this way, the resources of the particular client terminal are optimally adapted to the user's need, thus providing the best level of quality to the user.

A version of the method according to the invention is described in claim 8. In this version, the maximum waiting time per program, and hence the resources of the client terminal, are determined on the basis of the user profile. Such a user profile may be used to capture the user's preferences and to indicate the programs that the user is expected to request for future viewing. By providing shorter maximum waiting times for these programs, the client terminal's resources are optimally used for the quality of service for the user.

It is a further object of the invention to provide a system according to the preamble with an improved determination of the maximum waiting time. This object is achieved according to the invention in a system that also comprises client size determining means for determining the size of a client fraction of the program to be prerecorded by a particular client terminal in order to achieve a maximum waiting time of $w_i$, $w_i < w_{max}$.

The invention and its attendant advantages will be further elucidated with the aid of exemplary embodiments and the accompanying schematic drawings, wherein:

FIG. 1 schematically shows an overview of a system according to the invention with a number of client terminals;

Corresponding features in the various Figures are denoted by the same reference symbols.

Figure 1:
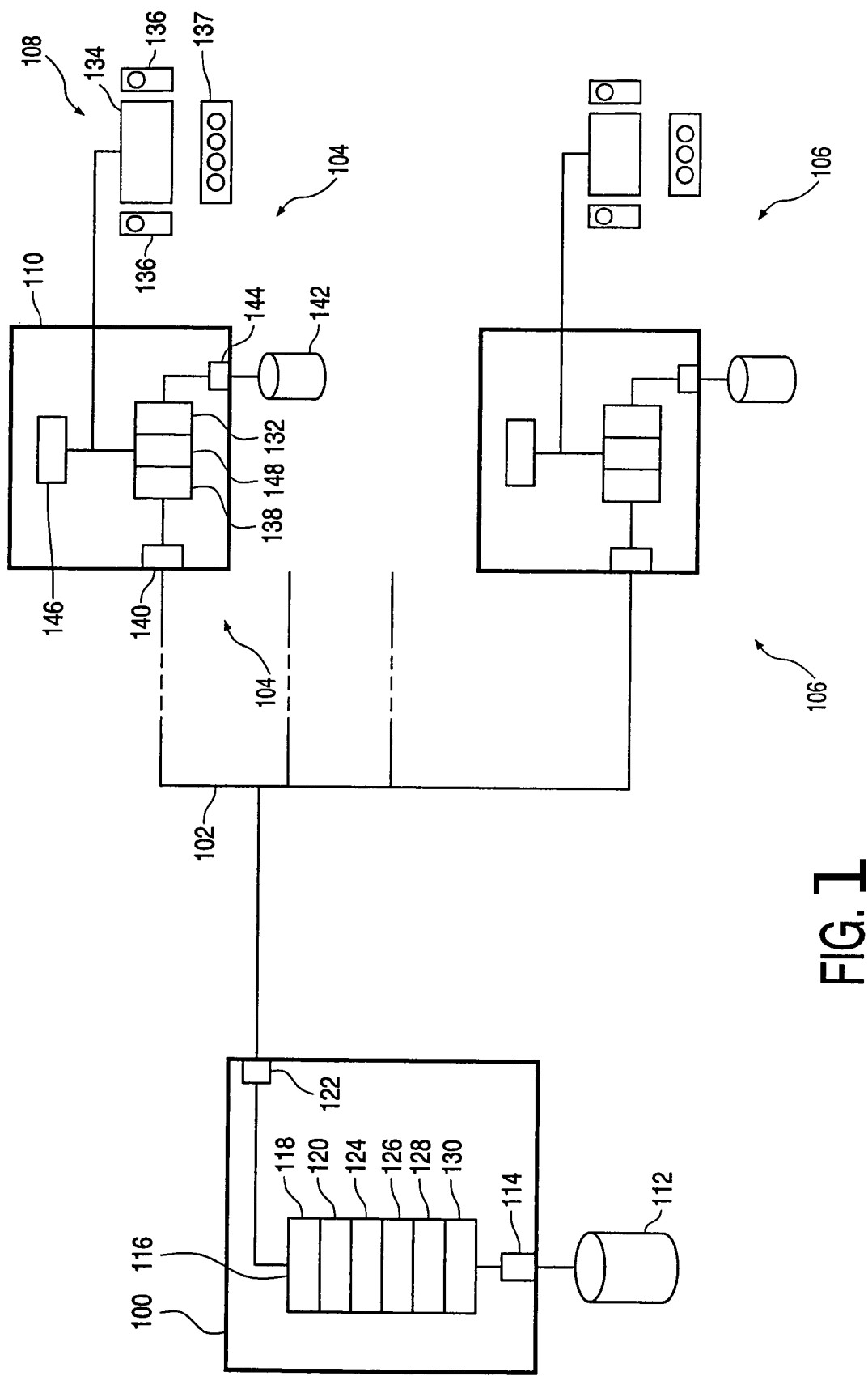

FIG. 1 schematically shows an overview of a system according to the invention with a number of client terminals. A system 100 supplies, via a connection network 102, a number of programs to a potentially large number of client terminals. Only a client terminal 104 and a client terminal 106 are shown in the Figure. The connection network 102 may be implemented as a cable TV network or may be any other type of connection suitable to transport a program from a central system to a client terminal. A program is understood to be a sequence of signal data that is typically presented to a user as a whole. Examples are a video program, a movie and an audio program, but other types are also feasible. In the present embodiment, the system 100 is a near-video-on-demand system that offers a collection of video movies to the client terminals by using broadcast channels of the connection network 102 for distributing the video material. By repeatedly transmitting the same video content, the waiting time for a user of a client terminal to start watching a video from the collection is limited to a certain maximum waiting time. The maximum waiting time is a major quality of service parameter for a near-video-on-demand system. A client terminal can be regarded as a television set 108 enhanced with some communication and control functionality embedded in a set-top box 110. However, the additional functionality may also be integrated in the television set itself. Furthermore, the client terminal may be implemented on a personal computer or other suitable computer platform.

The system 100 has a storage device 112 comprising the video movies to be supplied to the client terminals. The storage device is accessed through an interface 114. The various functions of the system 100 are typically realized as software modules that can be loaded into a working memory symbolized by box 116 for execution. The distribution of the functions over different software modules as described below is given merely by way of example and other distributions are possible as well. The system 100 has a schedule determining module 118 for determining the schedule that is to be used for broadcasting a certain movie. The different types of schedule and how they are constructed is described in more detail with reference to the FIGS. 2 and 3 below. The broadcast schedule may be based on a popularity rating for the movies in the video movie collection; for a more popular movie a broadcast schedule will then be created with a shorter maximum waiting time. Furthermore, the system 100 has a broadcasting module 120 for broadcasting the movie by retrieving appropriate data from the storage device 112 and supplying it, via a network interface 122, to the connection network 102.

As will be explained below, it may be necessary for all client terminals to prerecord an initial fraction of the movie in order to provide the users of the client terminals with the generally required maximum waiting time. To this end, the system 100 comprises an initial size determining module 124 for determining the size of this initial fraction.

Furthermore, the system 100 has a supply module 126 for supplying the initial fraction to the client terminals. This initial fraction is supplied in advance and is not part of the broadcast schedule. The initial fraction may be supplied via the same connection network 102, e.g. via a channel that is dedicated for this purpose, or via an ordinary channel outside the normal operation hours. Alternatively, the initial fraction may be supplied to the client terminals via a totally different network, e.g. the Internet. Furthermore, the system 100 has a second schedule determining module 128 for determining the broadcast schedule for the remainder of the movie that still is to be supplied to the client terminals. This second schedule determining module 128 may be integrated into one module with the schedule determining module 118. In the same way, the system 100 has a second broadcasting module 130 for broadcasting the remainder of the movie. This second broadcasting module 130 may be combined with the broadcasting module 120. According to the invention, there must be a client size determining module 132 that determines the size of the fraction of the program that must additionally be prerecorded at the client terminal in order to achieve a desired shorter maximum waiting time than the general maximum waiting time available for all client terminals. This client size determining module 132 will typically be implemented in the client terminal, so that it can locally determine the size of the additional fraction to be prerecorded; however, it could also reside at another location in the system.

A client terminal, like the client terminal 104, has a display 134 and speakers 136 to reproduce the received movie for the user. The client terminal 104 furthermore has a user input mechanism, like a keyboard 137, to enter user information. This can be the selection of a movie to be received in the client terminal or the specification of a desired maximum time for a given movie. The client terminal may be implemented on a computer platform with the various functions implemented in software modules. The client terminal 104 has a receiving module 138 for receiving the supplied movie from the connection network 102 via a network interface 140. This receiving module is also arranged to receive the initial fraction of the movie and the additional client fraction of the movie. Both fractions will be stored on the local storage device 142, typically being a hard disk, via a disk interface 144. When receiving and reproducing a certain movie, a received block of the movie need not necessarily be reproduced immediately. In that case, such a received block will be temporarily stored in buffer 146 in the client terminal, from where it will be retrieved later for reproduction to the user. Furthermore, the client 104 may have a profile module 148 to create and store a user profile on the basis of the history of the user interactions. Typically, the user profile will contain an overview of the movies selected by the user for viewing, thus indicating the preferences of the user. The profile may be used to determine the size of the client fraction of the movie that is to be additionally prerecorded in the client terminal in order to achieve a maximum waiting time which is shorter than the general maximum waiting time offered by the system.

Figure 2:
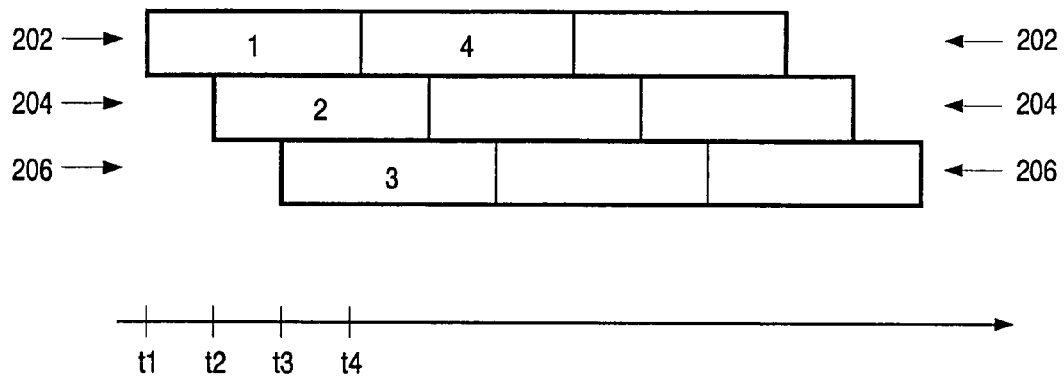
FIG. 2 illustrates a staggered broadcast schedule.

FIG. 2 illustrates a staggered broadcast schedule using 3 channels. Staggered broadcasting is a basic near-video-on-demand broadcast schedule. The principle is to repeatedly broadcast a given movie on multiple broadcast channels. The example in the Figure shows a channel 202, a channel 204, and a channel 206. The time is indicated by line 208 and runs from left to right. At $t=t_1$, the first broadcast of the movie starts in channel 202. At $t=t_2$, the second broadcast of the movie starts, now in channel 204, and at $t=t_3$ the third broadcast starts, that is, in channel 206. The fourth broadcast starts in channel 202, at $t=t_4$, immediately after the first broadcast has finished. The start times of the broadcast are evenly distributed in time. This makes that the period between two starting times is ⅓ of the duration of the movie. In general terms, the staggered broadcasting uses m channels which are numbered from 0 up to m−1. Furthermore, the unit of time is chosen to be equal to the duration of the movie, i.e. its duration is normalized to 1. Then the movie can be started exactly every 1/m time units, where the ith broadcast is carried out in channel number i mod m. Given this periodic staggered broadcast schedule, the maximum waiting time is equal to 1/m.

The system is designed with a certain maximum waiting time $w_{max}$ for the users of the client terminals that are serviced by the system. If this $w_{max} \geq 1/m$, a schedule as described above can directly be used. However, if $w_{max} < 1/m$, a certain initial fraction of the movie is to be prerecorded by the client terminals in order to meet the required maximum waiting time for this movie. This initial fraction is not part of the broadcast schedule and is distributed in another way, for example, via a dedicated channel or overnight when the system does not offer its regular service. When the user of the client terminal selects a movie, the initial fraction that is available on the terminal is played out first, thus reducing the waiting time to the start of the broadcast of the remainder of the movie. The size of the initial fraction of the movie that is to be prerecorded by all client terminals is given by:

$$\max\left(0, \frac{w_{max}+1}{m+1} - w_{max}\right) \quad (1)$$

If a denotes the size of the initial fraction that is to be prerecorded and b denotes the remainder of the movie that is periodically broadcast, then a+b=1. Now, the time between two successive starts of the movie is given by b/m.

If $(w_{max}+1)/(m+1)-w_{max} \geq 0$, then the last part of the movie representing a fraction of $(m+m \cdot w_{max})/(m+1)$ is repeatedly broadcast. An individual smaller maximum waiting time for a given client terminal is realized by prerecording an additional fraction in that client terminal. This fraction is part of the periodic broadcast schedule of the movie and can be received by the client terminal via the channels assigned to that schedule. The reception and prerecording must be done before the required smaller maximum waiting time can be effected on the client terminal. If for a given client terminal i the required maximum waiting time is given by $w_i$, expressed as a fraction of the duration of the movie, then the total amount of data that must be prerecorded in the client terminal i is given by:

$$\begin{cases} 0 & \text{if } \frac{1}{m} \leq w_i \\ \frac{1}{m} - w_i & \text{if } w_i \leq \frac{1}{m} \leq w_{max} \\ \frac{w_{max}+1}{m+1} - w_i & \text{if } w_{max} \leq \frac{1}{m} \end{cases} \quad (2)$$

At first sight, it does not appear realistic to choose $w_{max}$ to be larger than $1/m$, since it would then always be possible to decrease $w_{max}$ to $1/m$ without having to prerecord any data. However, the maximum waiting time in practice could be specified in absolute time, e.g. 5 minutes or 10 minutes. This absolute time results in different values for $w_{max}$, depending on the duration of the various movies. For long movies, this may result in prerecording a fraction of the movie to realize this absolute maximum waiting time, while for short movies this may not be necessary.

An example of the above is the following. The system has three channels for the staggered broadcast schedule, i.e. m=3, to broadcast a movie of 90 minutes. Now, let $w_{max}=\frac{1}{6}$, i.e. 15 minutes, and let $w_i=\frac{1}{18}$, i.e. 5 minutes, for a given client terminal i. Using equation (1), it can be concluded that every client terminal has to prerecord the first $\frac{1}{8}^{th}$ of the movie, i.e. the first 11.25 minutes. The remaining $\frac{7}{8}^{th}$ part of the movie is broadcast using the three channels, resulting in starting the movie every $\frac{1}{3} \cdot \frac{7}{8} \cdot 90 = 26.25$ minutes. Using equation (2), it can be concluded that client terminal i has to prerecord a total of $\frac{17}{72}^{th}$ part of the movie, i.e. 21.25 minutes.

Figure 3:
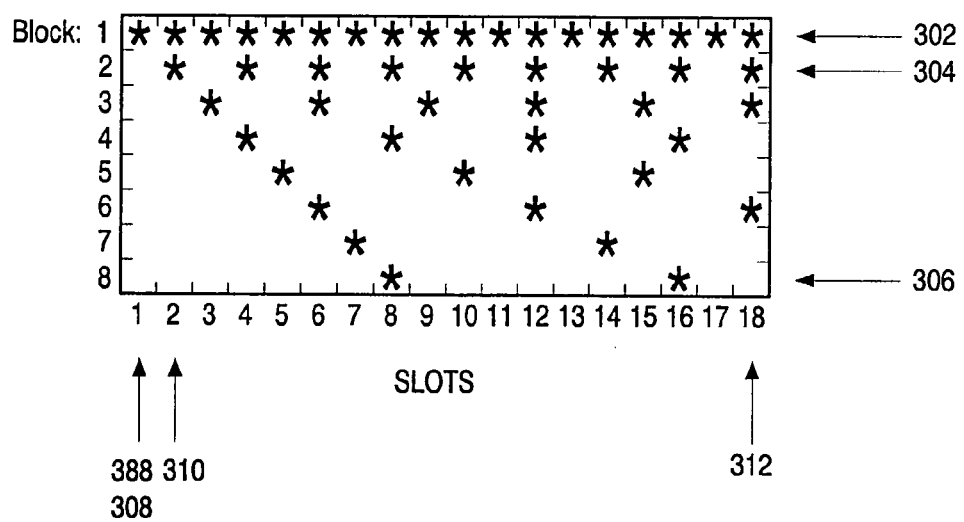
FIG. 3 illustrates a fragmented broadcast schedule.

FIG. 3 illustrates a fragmented broadcast schedule. In a fragmented broadcast schedule, a movie is split into multiple blocks, the blocks at the start of the movie being broadcast more frequently than blocks at the end of the movie. The broadcast channels 302, 304, . . . 306 are divided into slots 308, 310 . . . 312 such that each slot corresponds to the time required for broadcasting a block through that channel. In the schedule of FIG. 3, block i is broadcast in slot s if and only if s mod i=0. A '*'-symbol in FIG. 3 indicates that the marked block is broadcast in the relevant channel and slot. The Figure only shows the first 18 slots of the schedule. The resultant broadcast schedule of the blocks is periodic with a period that is equal to the least common multiple of 1, 2, 3, . . . , n, An important property of this schedule is that in each window of i successive slots, i=1, . . . n, there is exactly one broadcast of block i. This makes that a client terminal has to wait no more than one slot to be able to start a program or, more precisely, the client terminal has to wait till the start of the next slot. This schedule thus offers a maximum waiting time that equals the duration of a slot, which itself equals the duration of one block of the movie.

For the same reason as described above for a staggered broadcast schedule, it might be necessary in the fragmented broadcast schedule to prerecord a fraction of the movie in all client terminals in order to achieve a desired maximum waiting time $w_{max}$. Now, if the remainder of the movie is supplied in a fragmented broadcast schedule in which the remainder of the movie, or possibly the whole movie, is partitioned into $b_{max} - b_{min} + 1$ blocks, where the first block is broadcast at least once every $b_{min}$ slots, the second block once ever $b_{min}+1$ slots and the last block at least once every $b_{max}$ slots, the size of the initial fraction of the movie that is to be prerecorded by all client terminals is given by:

$$\max\left(0, \frac{w_{max}+1}{b_{max}+1} \cdot b_{min} - w_{max}\right) \quad (3)$$

If for a given client terminal i, the required maximum waiting time, expressed as a fraction of the duration of the movie, is given by $w_i$, with $w_i < w_{max}$, the total amount of data that must be prerecorded in the client terminal i is given by:

$$\begin{cases} 0 & \text{if } \frac{b_{min}}{b_{max}-b_{min}+1} \leq w_i \\ \frac{b_{min}}{b_{max}-b_{min}+1} - w_i & \text{if } w_i \leq \frac{b_{min}}{b_{max}-b_{min}+1} \leq w_{max} \\ \frac{w_{max}+1}{b_{max}+1} \cdot b_{min} - w_i & \text{if } w_{max} \leq \frac{b_{min}}{b_{max}-b_{min}+1} \end{cases} \quad (4)$$

An example of the above is the following. Let the last part of a movie be partitioned into 30 blocks that are repeatedly broadcast using two channels. The channels are divided into slots, one slot corresponding to the duration of broadcasting one block. Now, if the first of these blocks is broadcast at least once every 6 slots, the second block is broadcast at least once every 7 slots, . . . , and the $30^{th}$ block is broadcast at least once every 35 slots, then a user of a client terminal has to wait at most 6 slots. A periodic broadcast schedule with a period of 300 slots that broadcasts at the most 3 blocks per slot can be constructed that meets these requirements. Now, let $w_{max}=\frac{1}{6}$ for all client terminals and $w_i=\frac{1}{18}$ for a given client terminal i. Since $6/(35-6+1) = \frac{1}{5} > w_{max}$, data must be prerecorded for all client terminals. Using equation (3), the size of the initial fraction that has to be prerecorded by all client terminals equals $\frac{1}{36}$. The size of the fraction that client terminal i should prerecord in addition is given by $\frac{1}{6}-\frac{1}{18}=\frac{1}{9}$, resulting in a total fraction to be prerecorded by that client terminal of size $\frac{5}{36}$. Alternatively, if $w_{max}=\frac{1}{3}$ and $w_i=\frac{1}{9}$ for a given client terminal i, no initial fraction need be prerecorded by all client terminals. The size of the fraction that client terminal i has to prerecord is given by $\frac{1}{5}-\frac{1}{9}=\frac{4}{45}$.

The invention has been described above in the context of fixed staggered and fragmented broadcast schedules. However, the invention can also be applied in the context of adaptive broadcast schedules, be it staggered or fragmented, that are created and adapted in response to a user actually requesting a movie. Such adaptive schedules are optimized on the basis of the actual load of the system and may provide better schedules. An additional advantage of an adaptive schedule is that a client terminal submitting a request for a certain program in the system can indicate the amount of data of the program that has already been locally prerecorded. The system can then create a schedule that is optimally adapted to this current amount of prerecorded data.

The schedules described above can be used in a system with a cable TV setting where a fraction of the channels can be used for near-video-on-demand services. Clearly, the schedules can also be used in satellite TV systems. A further interesting alternative is to offer near-video-on-demand services via the Internet, where the video data is distributed by using multicasting. It holds for all these settings that shorter maximum waiting times require larger local storage devices.

Furthermore, it is also possible to offer different maximum waiting times for different movies in the given collection. The most popular movies can be broadcast with relatively many channels. The less popular movies can be broadcast with relatively few channels, resulting in a large maximum waiting time when no data is prerecorded. In addition, the maximum waiting time can be tuned to the preferences of the users of the client terminals by prerecording more or less data of each movie.

It should be noted that the above-mentioned embodiments illustrate rather than limit the invention and that those skilled in the art will be able to design many alternative embodiments without departing from the scope of the appended claims. In the claims, any reference signs placed between parentheses shall not be construed as limiting the claim. The word 'comprising' does not exclude the presence of elements or steps other than those listed in a claim. The word "a" or "an" preceding an element does not exclude the presence of a plurality of such elements. The invention can be implemented by means of hardware comprising several distinct elements and by means of a suitably programmed computer. In the unit claims enumerating several means, several of these means can be embodied by one and the same item of hardware.

The invention claimed is:

1. A method of supplying a program to a plurality of client terminals in a near-video-on-demand fashion using a redundant broadcast schedule including a number of redundant broadcast channels m in which users of the client terminals requesting a program have a first maximum waiting time of L/m, wherein L is a program length, the method comprising acts of:
   determining a broadcast schedule for the program; and
   broadcasting the program according to this broadcast schedule;
   determining the size of an initial fraction of the program to be prerecorded by the client terminals in order to achieve a second maximum waiting time of $w_{max}$, wherein $w_{max}$ <L/m;
   supplying the initial fraction of the program;
   prerecording the initial fraction of the program in the client terminals;
   determining a size of a client fraction of the program to be prerecorded by the particular client terminal i in order to achieve a third maximum waiting time of $w_i$, $w_i$ <$w_{max}$; and
   prerecording the client fraction of the program in the particular client terminal I,
wherein said method further comprises the acts of:
   determining the broadcast schedule for the remainder of the program; and
   broadcasting the remainder of the program according to this broadcast schedule,
and wherein the remainder of the program is supplied in a fragmented periodic fashion in which the remainder of the program is partitioned into $b_{max}-b_{min}+1$ blocks, where the first block is broadcast at least once every $b_{min}$ slots, the second block once every $b_{min}+1$ slots and the last block at least once every $b_{max}$ slots, and wherein the size of the initial fraction is substantially equal to $$\max\left(0, \frac{w_{max}+1}{b_{max}+1} \cdot b_{min} - w_{max}\right) \quad (3)$$

wherein,
   $w_{max}$ is the second maxium waiting time for all client terminals expressed as a fraction of the duration of the program.

2. The method as claimed in claim 1, wherein the remainder of the program is supplied in a staggered periodic fashion using the m channels and wherein the size of the initial fraction is substantially equal to $$\max\left(0, \frac{w_{max}+1}{m+1} - w_{max}\right) \quad (1)$$

wherein,
   $w_{max}$ is the second maximum waiting time for all client terminals expressed as a fraction of the duration of the program.

3. The method as claimed in claim 2, wherein the sum of the size of the initial fraction and the size of the client fraction is substantially equal to $$\begin{cases} 0 & \text{if } \frac{1}{m} \leq w_i \\ \frac{1}{m} - w_i & \text{if } w_i \leq \frac{1}{m} \leq w_{max} \\ \frac{w_{max}+1}{m+1} - w_i & \text{if } w_{max} \leq \frac{1}{m} \end{cases} \quad (2)$$

wherein,
   $w_{max}$ is the second maximum waiting time for all client terminals expressed as a fraction of the duration of the program, and
   $w_i$ is the third maximum waiting time for the particular client terminal i expressed as a fraction of the duration of the program.

4. The method as claimed in claim 1, wherein the sum of the size of the initial fraction and the size of the client fraction is substantially equal to $$\begin{cases} 0 & \text{if } \frac{b_{min}}{b_{max}-b_{min}+1} \leq w_i \\ \frac{b_{min}}{b_{max}-b_{min}+1} - w_i & \text{if } w_i \leq \frac{b_{min}}{b_{max}-b_{min}+1} \leq w_{max} \\ \frac{w_{max}+1}{b_{max}+1} \cdot b_{min} - w_i & \text{if } w_{max} \leq \frac{b_{min}}{b_{max}-b_{min}+1} \end{cases} \quad (4)$$

wherein,
   $w_{max}$ is the second maximum waiting time for all client terminals expressed as a fraction of the duration of the program,
   $w_i$ is the third maximum waiting time for the particular client terminal i expressed as a fraction of the duration of the program.

5. The method as claimed in claim 1, wherein the third maximum waiting time $w_i$ is determined by the user of the particular client terminal.

6. The method as claimed in claim 1, wherein a plurality of programs is supplied to the plurality of client terminals, wherein a user profile on a particular client terminal is determined on the basis of a history of programs requested by the user of the particular client terminal, and wherein the third maximum waiting time $w_i$ is determined on the basis of the user profile on the particular client terminal.

7. The method as claimed in claim 1, wherein a plurality of programs is supplied to the plurality of client terminals, each of the programs having a popularity rating indicating the present popularity of the program, and wherein the second maximum waiting time $w_{max}$ of the broadcast schedule for a particular one of the programs is based on the popularity rating of that program.

8. A system for supplying a program to a plurality of client terminals in a near-video-on-demand fashion using a redundant broadcast schedule including a number of redundant broadcast channels m in which users of the client terminals requesting a program have a first maximum waiting time L/m, wherein L is a program length, the system comprising:
    schedule determining means for determining a broadcast schedule for the program; and
    broadcast means for broadcasting the program according to this broadcast schedule;
    determining means for determining the size of an initial fraction of the program to be prerecorded by the client terminals in order to achieve a second maximum waiting time of $w_{max}$, wherein $w_{max}<L/m$;
    supplying means for supplying the initial fraction of the program;
    prerecording means for prerecording the initial fraction of the program in the client terminals; and
    client size determining means for determining the size of a client fraction of the program to be prerecorded by a particular client terminal in order to achieve a third maximum waiting time of $w_i$, $w_i<w_{max}$,
wherein said system further comprises:
    second schedule determining means for determining the broadcast schedule for the remainder of the program; and
    second broadcasting means for broadcasting the remainder of the program according to this broadcast schedule, and wherein the remainder of the program is supplied in a fragmented periodic fashion in which the remainder of the program is partitioned into $b_{max}-b_{min}+1$ blocks, where the first block is broadcast at least once every $b_{min}$ slots, the second block once every $b_{min}+1$ slots and the last block at least once every $b_{max}$ slots, and wherein the size of the initial fraction is substantially equal to $$\max\left(0, \frac{w_{max}+1}{b_{max}+1} \cdot b_{min} - w_{max}\right) \quad (3)$$

wherein,
    $w_{max}$ is the second maxium waiting time for all client terminals expressed as a fraction of the duration of the program.

9. A method of supplying a program to a plurality of client terminals in a near-video-on-demand fashion using a redundant broadcast schedule in which users of the client terminals requesting a program have a second maximum waiting time $w_{max}$ until the respective client terminals are able to present the start of the program, the method comprising the acts of:
    determining a broadcast schedule for the program;
    broadcasting the program according to this broadcast schedule;
    for a particular client terminal i the step of determining the size of a client fraction of the program to be prerecorded by the particular client terminal i in order to achieve a third maximum waiting time of $w_i$, $w_i<w_{max}$; and
    in the particular client terminal i the step of prerecording the client fraction of the program;
    determining the size of an initial fraction of the program to be prerecorded by the client terminals in order to achieve the second maximum waiting time of $w_{max}$;
    supplying the initial fraction of the program;
    prerecording the initial fraction of the program in the client terminals;
    determining the broadcast schedule for the remainder of the program; and
    broadcasting the remainder of the program according to this broadcast schedule, wherein the remainder of the program is supplied in a fragmented periodic fashion in which the remainder of the program is partitioned into $b_{max}-b_{min}+1$ blocks, where the first block is broadcast at least once every $b_{min}$ slots, the second block once every $b_{min}+1$ slots and the last block at least once every $b_{max}$ slots, and wherein the size of the initial fraction is substantially equal to $$\max\left(0, \frac{w_{max}+1}{b_{max}+1} \cdot b_{min} - w_{max}\right) \quad (3)$$

wherein,
    $w_{max}$ is the second maximum waiting time for all client terminals expressed as a fraction of the duration of the program.

10. The method as claimed in claim 9, wherein the sum of the size of the initial fraction and the size of the client fraction is substantially equal to $$\begin{cases} 0 & \text{if } \frac{b_{min}}{b_{max}-b_{min}+1} \leq w_i \\ \frac{b_{min}}{b_{max}-b_{min}+1} - w_i & \text{if } w_i \leq \frac{b_{min}}{b_{max}-b_{min}+1} \leq w_{max} \\ \frac{w_{max}+1}{b_{max}+1} \cdot b_{min} - w_i & \text{if } w_{max} \leq \frac{b_{min}}{b_{max}-b_{min}+1} \end{cases} \quad (4)$$

wherein,
    $w_{max}$ is the second maximum waiting time for all client terminals expressed as a fraction of the duration of the program,
    $w_i$ is the third maximum waiting time for the particular client terminal i expressed as a fraction of the duration of the program.

* * * * *